Patented Oct. 22, 1929

1,732,727

UNITED STATES PATENT OFFICE

ARTHUR JAMES LINE, OF EDGBASTON, ENGLAND

ALUMINUM SOLDER

No Drawing. Application filed June 7, 1926, Serial No. 114,260, and in Great Britain September 8, 1925.

This invention has reference to solders for aluminum and aluminum alloys and has for its object to provide a solder which will not disintegrate under the action of the atmosphere or sea water whilst a further feature of the solder is its high tensile strength.

A solder according to one form of this invention comprises a mixture of silver and aluminum.

A satisfactory solder consists of the following proportions 3 parts by weight of silver and 12 parts by weight of aluminum but it may be found that these proportions may be varied according to the degree of purity of the aluminum or the composition of the alloy to be united.

A modified form of solder which is particularly applicable to the soldering of duralumin consists of a mixture of aluminum, silver, tin and zinc and it has been found that the following proportions by weight produce an efficient solder, 12 of aluminum, 5 of silver, 4½ of tin, and 4½ of zinc.

A further modified form of solder which has a lower melting point than those described before consists of silver, tin and zinc and it has been found that the following proportions by weight give a very effective solder, 6 parts of tin, 6 parts of zinc, and 4 parts of silver; if desired these proportions can be varied according to the nature of the aluminum or its alloys which it is desired to solder.

The modified forms of solder will readily solder aluminum duralumin, aluminum to duralumin, aluminum or duralumin to iron or steel.

In the mixing of the before described solders the aluminum or a proportion of the aluminum is first melted and the silver is then added which will be found to be readily absorbed by the aluminum whilst the remainder of the aluminum is then added, whilst when the modified form of solder is being produced the tin and zinc will be added after the aluminum and silver have been mixed.

In using the before described solders a blow pipe is preferably used which is provided with an adjustable bit which is preferably made of nickel, the flame produced by the blow pipe being arranged to impinge on to the bit and on to the junction of the parts to be soldered.

The parts to be soldered are first heated and retained at a fair temperature owing to the fact that aluminum and its alloys readily conduct heat and this heating, prevents the heat produced by the blow pipe flame, on the joint, being readily conducted away, although with the last described solder very little first heating is required.

It has been found by treating the edges of the joint to be soldered with the modified forms of solder heretofore described, a joint can also be made with a soft solder consisting of tin and zinc which is preferably applied with an ordinarily copper soldering bit which is provided with a blow pipe flame in order to produce sufficient heat to make an effective joint owing to the high conductivity of aluminum and its alloys.

Where aluminum or duralumin is soldered to iron or steel the modified forms of solder is used, the iron or steel is first of all tinned in the usual way but the tinning is preferably done by means of a solder of tin and zinc, the aluminum or duralumin then being united to the iron or steel by means of the before mentioned modified forms of solder.

In preparing the before described solders the silver is preferably pure, whilst in the use of the solders no fluxes are used.

What I claim is:—

A solder for aluminum and its alloys consisting of a composition of approximately 3 parts by weight of silver and approximately 12 parts by weight of aluminum.

In testimony whereof, I have signed my name to this specification.

ARTHUR JAMES LINE.